United States Patent [19]
Hüfner et al.

[11] Patent Number: 5,893,638
[45] Date of Patent: Apr. 13, 1999

[54] SIDE LAMP USABLE AS A TURN SIGNAL SIDE LAMP AND AS A SIDE MARKING LAMP

[75] Inventors: Werner Hüfner, Oberkochen; Dirk Brinkmann, Wiernsheim; Gerald Hiesl, Herrenberg; Roman Porsche, Leonberg, all of Germany

[73] Assignee: Dr. Ing. h.c.F. Porsche AG, Weissach, Germany

[21] Appl. No.: 08/766,482

[22] Filed: Dec. 13, 1996

[30] Foreign Application Priority Data

Dec. 13, 1995 [DE] Germany .................. 195 46 436

[51] Int. Cl.⁶ .................................................. B60Q 1/32
[52] U.S. Cl. ...................... 362/506; 362/487; 340/468
[58] Field of Search ................. 362/61, 78, 80, 362/81, 82, 833.3, 83, 487, 495, 496, 500, 505, 506, 507, 293; 280/847, 848; 340/468, 475

[56] References Cited

U.S. PATENT DOCUMENTS

| | | | |
|---|---|---|---|
| 1,624,436 | 4/1927 | Rosemier | 362/83 |
| 1,898,842 | 2/1933 | Lowe | 362/83 |
| 1,943,440 | 1/1934 | Homi . | |
| 2,543,226 | 2/1951 | Briggs | 362/83 |
| 2,786,935 | 3/1957 | Geary | 362/83 |
| 3,017,500 | 1/1962 | Pezzopane | 362/83 |
| 3,435,200 | 3/1969 | Massoll et al. | 362/83 |
| 4,797,792 | 1/1989 | Oen | 362/83 |
| 4,802,069 | 1/1989 | Chandler | 362/83 |
| 4,855,878 | 8/1989 | Vu et al. | 362/83 |
| 4,879,543 | 11/1989 | Smith, Sr. . | |
| 5,032,955 | 7/1991 | Jurgens | 362/82 |
| 5,040,100 | 8/1991 | Di Gaetano | 362/80 |
| 5,081,564 | 1/1992 | Mizoguchi et al. | 362/80 |
| 5,172,972 | 12/1992 | Terao | 362/293 |
| 5,255,164 | 10/1993 | Eidelman | 362/80 |
| 5,287,101 | 2/1994 | Serizawa | 362/80 |
| 5,548,274 | 8/1996 | Anderson et al. | 362/78 |
| 5,558,426 | 9/1996 | Cabanatan et al. | 362/78 |
| 5,573,686 | 11/1996 | Lavicska | 362/83 |
| 5,685,628 | 11/1997 | Feger et al. | 362/61 |
| 5,692,824 | 12/1997 | Ooishi | 362/80 |
| 5,707,132 | 1/1998 | Ooki et al. | 362/61 |

FOREIGN PATENT DOCUMENTS

0536435A1 4/1993 European Pat. Off. .

OTHER PUBLICATIONS

Search Report, May 22, 1998, Europe.

*Primary Examiner*—Alan Cariaso
*Attorney, Agent, or Firm*—Evenson McKeown Edwards & Lenahan, PLLC

[57] ABSTRACT

This invention relates to a side lamp for vehicles which have an opening in their shell. In order to provide a side lamp which can be used as a turn signal side lamp and as a side marking lamp, it is suggested to construct the side lamp as part of an edge of an opening, preferably a wheel opening, on the shell of the vehicle. It is also contemplated to provide a reflector as a component of the side lamp which can be designed as part of a cover plate of the side lamp.

10 Claims, 3 Drawing Sheets

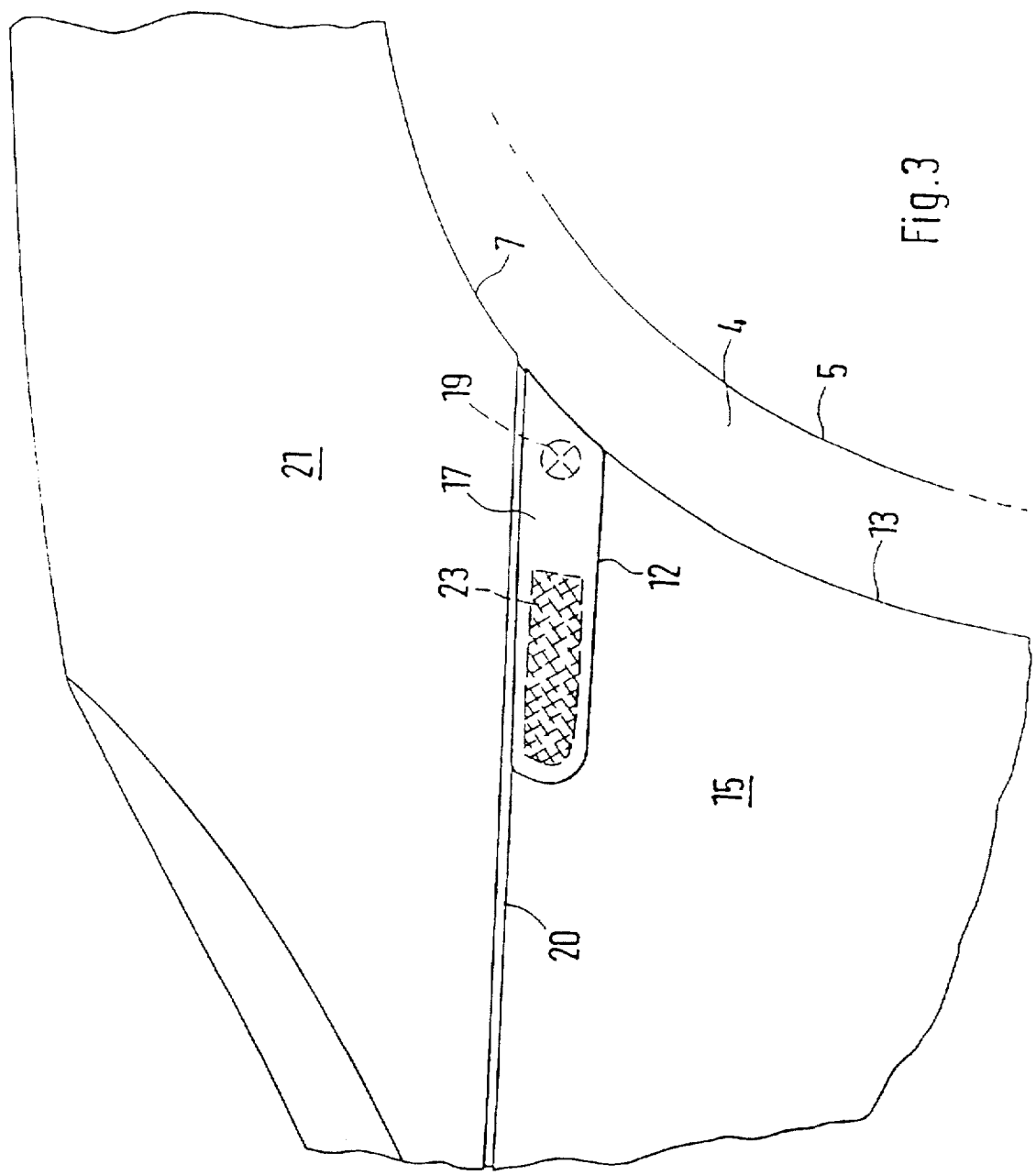

SIDE LAMP USABLE AS A TURN SIGNAL SIDE LAMP AND AS A SIDE MARKING LAMP

BACKGROUND AND SUMMARY OF THE INVENTION

This invention relates to a side lamp for vehicles of the type having a body shell provided with an opening.

For the traffic safety of vehicles, it is necessary that the direction signals of the vehicle, if possible, are visible from any point with respect to the vehicle. Pertaining technical regulations stipulate, for example, that the front turn signal lamps must be visible at an angle of at least 5° with respect to the longitudinal axis of the vehicle against the driving direction.

On the other hand, it has become customary for aerodynamic reasons to provide the forward area of vehicles with a tapering. This means that, viewed in the driving direction, the shell of the vehicle is sloped in the direction of the longitudinal axis of the vehicle. In the case of such a design of the shell, it is impossible by means of a conventional turn signal lamp to meet the above-mentioned requirements. In order to increase the visibility of the forward turn signal lamp toward the rear, it is generally known to provide in the cover plate of the turn signal lamp a projection provided with reflectors by means of which the turn signal lamp can beam a portion of its light from a position outside the body shell. However, for aerodynamic as well as visual reasons, such a switching of the turn signal lamp is not always desirable. In addition, depending on the slope of the forward area of the vehicle, its use is limited.

It is also known to mount a separate turn signal side lamp on an area of the vehicle shell which is sloped essentially in parallel to the longitudinal direction of the vehicle or slightly against the driving direction. These turn signal side lamps are always arranged behind the front wheel and supplement the forward turn signal lamp in such a manner that the above-mentioned requirements are met.

However, such turn signal side lamps are not permitted in several countries. Instead a side marking lamp is required there which is lit continuously together with the vehicle lighting system. This side marking lamp increases the visibility of the vehicle. However, side marking lamps must only have a narrow distance to the forward end of the vehicle in order to also indicate the dimensions of the vehicle.

This situation presents the problem that, depending on the different countries in which the vehicle is used, the vehicle must be equipped with a side marking lamp or with a turn signal side lamp. Openings for these parts must be provided in the shell of the vehicle. This requires, in turn, that either blind plugs or similar devices must be provided for the unused openings or that the concerned shell parts of the vehicle must be manufactured specifically for the different countries. Both of these measures considerably increase the logistic expenditures during the manufacturing of the vehicle. In addition, blind plugs in the shell of the vehicle are not very attractive visually.

It is an object of the invention to provide, based on this state of the art, a side lamp which meets the above-mentioned requirements and can therefore be used as a turn signal side lamp as well as a side marking lamp.

According to the invention, this object is achieved in that the side lamp is constructed as part of an edge of an opening of the shell of the vehicle. This opening can preferably be a wheel opening and the side lamp should be arranged there on She edge which is situated toward the closest end of the vehicle.

If the side lamp is also arranged in the area of the joint of two parts of the shell, for example, of the fender forming the upper wheel house opening and of the front end forming the forward lower wheel house opening, the additional benefit is achieved that the deviations of the fit of the two parts, which are particularly visible in this area, can be compensated by means of the side lamp.

For increasing the lateral recognizability of the vehicle in darkness as well as for meeting legal requirements, it is also contemplated to provide a reflector as part of the side lamp. This reflector can be constructed as part of a cover plate of the side lamp.

Other objects, advantages and novel features of the present invention will become apparent from the following detailed description of the invention when considered in conjunction with the accompanying drawings.

BRIEF DESCRIPTION OF THE DRAWINGS

FIG. 3 is a lateral view of the side lamp according to the invention.

DETAILED DESCRIPTION OF THE DRAWINGS

Figure 1:
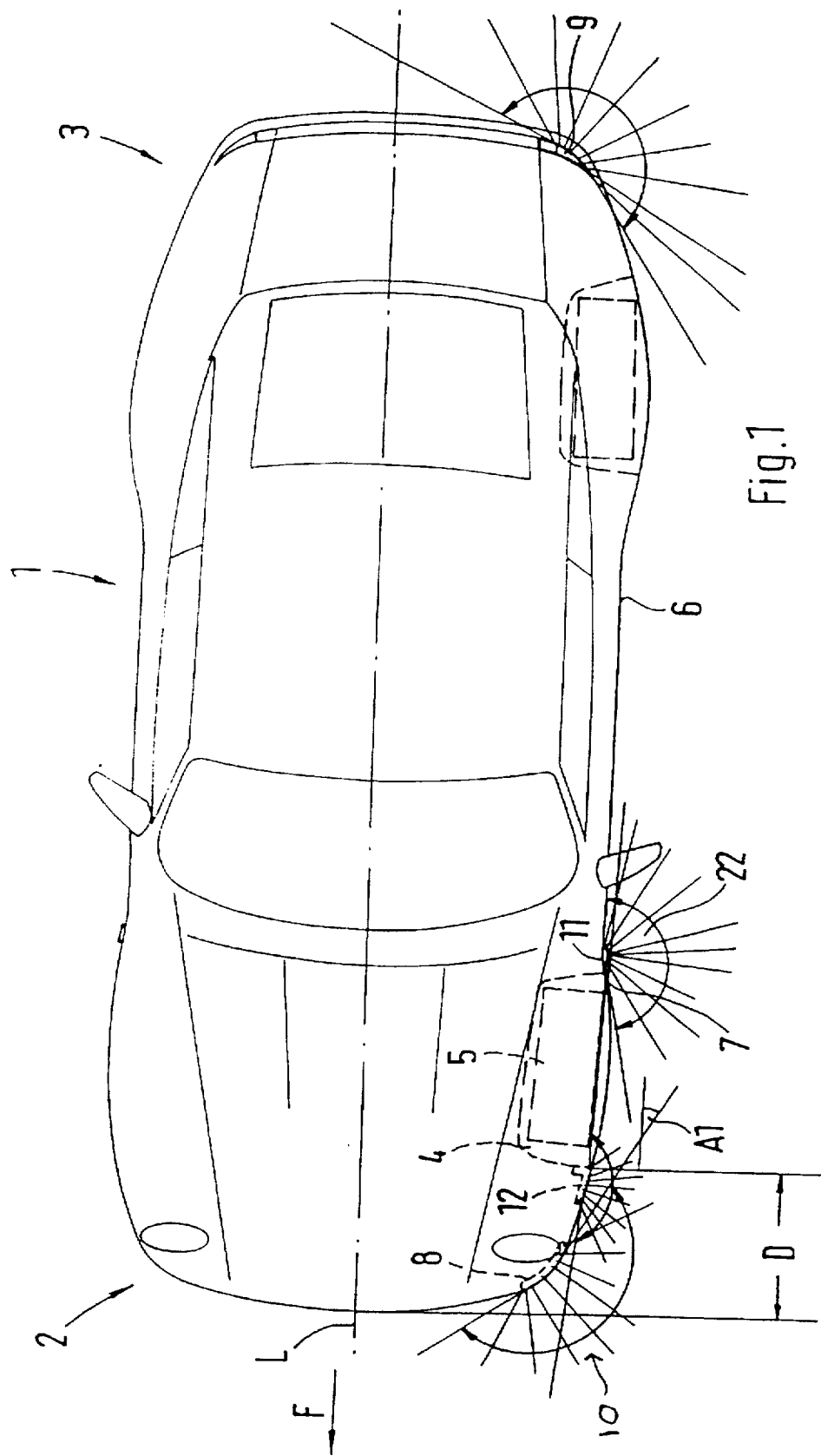
FIG. 1 is a top view of a motor vehicle showing different turn signal lamps and their beaming action.

The vehicle illustrated in FIG. 1 has a forward area 2 as well as a rearward area 3. The forward area 2 of the vehicle is the area which is situated in front of a forward wheel house 4 of a front wheel 5 of the vehicle 1. In a shell 6 of the vehicle, the forward wheel house 4 is formed in a wheel house opening 7. The longitudinal axis of the vehicle is marked L; the forward driving direction is marked F. For indicating the driving direction, a forward turn signal lamp 8 as well as a rearward turn signal lamp 9 are provided on the left vehicle side. The same applies to the other vehicle side.

The forward area 2 of the vehicle is pulled in; that is, the shell 6 is sloped in this area toward the longitudinal axis L of the vehicle viewed in the driving direction so that the vehicle tapers in the driving direction. Since, for aerodynamic as well as for stylistic reasons, the forward side lamp 8 is arranged flush with the shell, its visibility is limited by the course of the shell and is visible in a beaming range 10. Because of the shape of the forward area 2, the visibility toward the rear, that is, opposite to the driving direction, is limited and the angle A1 between the rearward limit of the beaming range 10 and the longitudinal axis L of the vehicle amounts to approximately 25° in the embodiment shown.

In order to achieve the visibility of the turn signal toward the rear with a beaming angle of no more than 5° which is required for driving safety and is also stipulated by law, a turn signal side lamp 11 with a beaming range 22 is therefore normally provided which is arranged behind the front wheel 6 on the shell 5 of the vehicle.

Figure 2:
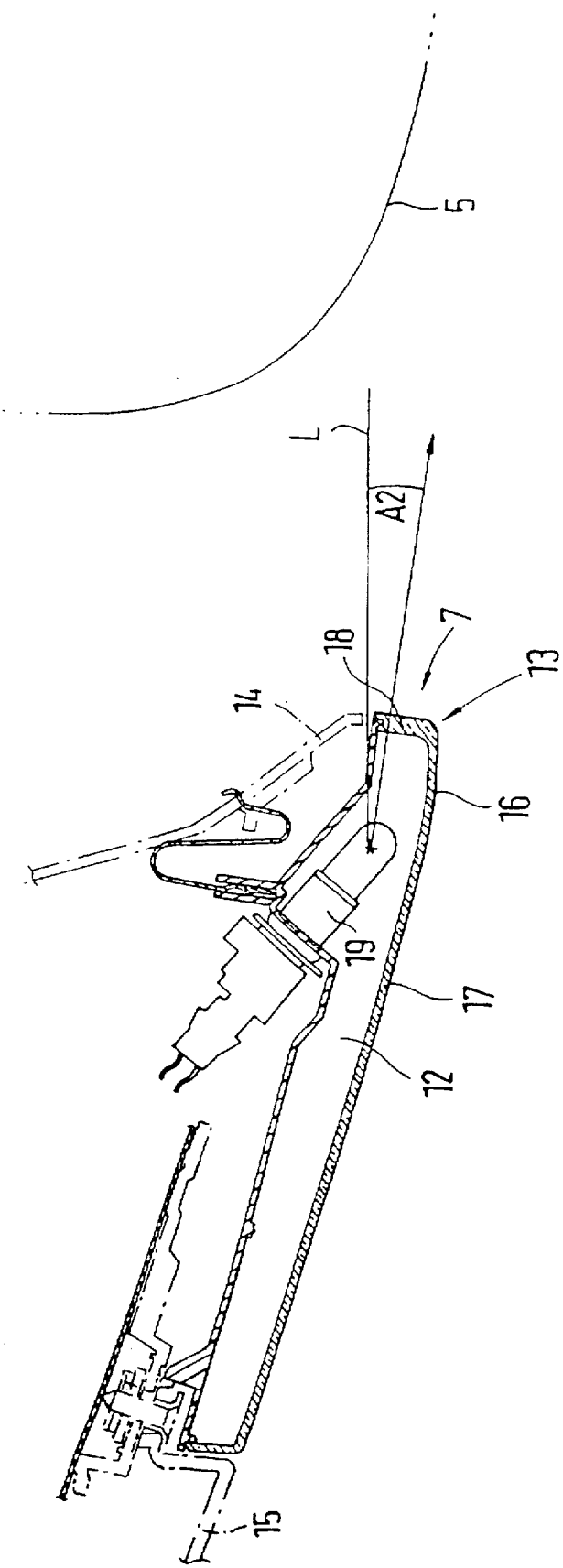
FIG. 2 is a horizontal sectional view of a side lamp according to the invention.

According to the invention, instead of this turn signal side lamp 11, a side lamp used as a turn signal side lamp 12 is arranged such that it forms a part of the wheel house opening 7 (FIGS. 2, 3). It extends over and past an edge 13 of the wheel house opening 7 between a wheel house inner panel 14 and a front end 15 which forms part of the area 2. More precisely, the light-permeable cover plate 16 of the turn signal side lamp 12 extends beyond the edge 13 so that the cover plate 16 has a first part 17 which forms a continuation of the forward area 2 to the edge 13, and has a second part 18 which extends away from the edge 13 to the wheel house inner panel 14.

An electric bulb 19 is arranged in the turn signal side lamp 12 in such a manner that the light beam which emerges from the turn signal side lamp and is sloped the most against the driving direction F, encloses an angle A2 with the longitudinal direction of the vehicle which is smaller than 5°. For this purpose, the light emerges through the second part 18 of the cover plate 16 which is not part of the shell 6 but part of the wheel house opening 7.

As illustrated in FIG. 3, the turn signal side lamp 12 is disposed on a joint 20 between the front end 15 and a fender 21 which forms a forward upper area of the wheel house opening 7. Although the front end 15 and the fender 21 are constructively coordinated with one another, it is unavoidable that, because of manufacturing tolerances, the measurements in the area of the joint 20 are not identical. Such tolerances are particularly clearly visible in the wheel house opening 7 because here deviations may occur on both sides of the edge 13. For compensating these tolerances, the turn signal side lamp 12 is constructed as part of the edge 13 of the wheel house opening 7 between the front end 15 and the fender 21. For this purpose, the turn signal side lamp 12 is elastically fastened and is supported in a manner not shown in detail in its upper area on the fender 21 and in its lower area on the front end 15. It therefore provides, particularly in the area of the edge 13, a transition between the course of the edge 13 in the area of the fender 21 and the course of the edge 13 in the area of the front end 15. Likewise, by means of the adjustment of the position of the turn signal side lamp 12 in the direction of the longitudinal axis L of the vehicle, a tolerance compensation can be achieved for the front end 15 and the fender 21.

To the extent that, instead of the turn signal side lamp 12, a side marking lamp is required, it is stipulated with respect to this side marking lamp that its mounting site must not exceed a specific distance from the forward end of the vehicle. Since toe mounting site of the turn signal side lamp 12 is in front of the forward wheel of the vehicle 1 and therefore has a comparatively short distance D from the forward end of the vehicle, in countries in which it is required, the turn signal side lamp 12 can also be used as a side marking lamp by means of a chanced control. Independently of the country in which the vehicle 1 is used, a single mounting site is therefore required For the design as the turn signal side lamp as well as for the design as the side marking lamp and must therefore be provided only once in the shell 6 of a corresponding opening or the like.

In its application as a turn signal side lamp as well as in its application as a side marking lamp, the illustrated side lamp can be combined with a reflector 23 which, as illustrated in FIG. 3, can be arranged in a first part 17 of the cover plate 16.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Side lamp for a vehicle of the type having a vehicle longitudinal centerline and a vehicle body shell with a wheel house opening facing laterally with respect to the vehicle centerline, said wheel house opening having a front edge and a rear edge defined by the body shell, said side lams comprising a light source and a light permeable cover plate, wherein the side lamp is arranged within a cutout in the body shell such that the light permeable cover plate forms a portion of the front edge of the opening and extends substantially flush with respect to laterally outwardly facing adjoining body shell portions, wherein the light source faces rearwardly with respect to the vehicle, and wherein the light permeable cover plate includes portions facing rearwardly of the vehicle so that light emerges therefrom in a rearward direction.

2. Side lamp according to claim 1, wherein the side lamp is arranged on the edge in an area of a joint of two parts of the shell.

3. Side lamp according to claim 1, wherein a reflector is part of the side lamp.

4. Side lamp according to claim 2, wherein a reflector is part of the side lamp.

5. Side lamp assembly for a vehicle of the type having a vehicle longitudinal centerline and a vehicle body shell with a front wheel house opening facing laterally with respect to the vehicle centerline, said front wheel house opening having a front edge and a rear edge defined by the body shell, said body shell including an inclined portion extending adjacent to and forwardly of the wheel house opening which is inclined in a forward direction of the vehicle toward the centerline, said side lamp assembly comprising:

a light permeable side lamp cover plate which extends substantially flush with adjoining portions of the body shell and forwardly from said opening such that a rear end of said cover plate forms part of the front edge of said opening and faces rearwardly so that light emerges therefrom in a rearward direction, and a rearwardly facing lamp disposed under the side lamp cover plate.

6. Side lamp assembly according to claim 5, wherein said lamp and cover plate are operable as a vehicle turn signal lamp assembly.

7. Side lamp assembly according to claim 5, wherein said lamp and cover plate are operable as a vehicle side marking lamp assembly.

8. Side lamp assembly according to claim 5, wherein said cover plate in use forms a part of a joint between a fender defining an upper part of said opening of said front wheel house and a front end of the body shell.

9. A method of making a vehicle body structure with a side lamp assembly which can alternatively serve as a turn signal lamp and a side marking lamp, comprising:

forming a lamp accommodating opening in a forward vehicle body shell part, which shell part extends forwardly from a wheel house opening in an inclined direction tapered toward a vehicle centerline, said lamp accommodating opening being disposed at a front edge of the wheel house opening, placing a light permeable side lamp cover plate in said lamp accommodating opening with laterally facing portions of the cover plate extending substantially flush with adjoining portions of the shell part, said lamp cover plate having a front end and a rear end, said rear end of said cover plate defining a part of the wheel house opening and facing rearwardly so that in use light emerges therefrom in a rearward direction, and placing a rearwardly facing lamp under the side lamp cover plate.

10. A method according to claim 9, wherein said cover plate in use forms a part of a joint between a fender defining an upper part of said front wheel house and opening a front end of the body shell.

* * * * *